(12) United States Patent
Wietzke et al.

(10) Patent No.: US 6,968,217 B2
(45) Date of Patent: Nov. 22, 2005

(54) MOTOR VEHICLE TELEPHONE SYSTEM

(75) Inventors: Joachim Wietzke, Karlsruhe (DE); Stefan Wolf, Muehltal (DE); Dirk Lappe, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 475 days.

(21) Appl. No.: 09/790,944

(22) Filed: Feb. 21, 2001

(65) Prior Publication Data

US 2001/0051533 A1 Dec. 13, 2001

(30) Foreign Application Priority Data

Feb. 21, 2000 (DE) .......................................... 100 07 812

(51) Int. Cl.[7] .................................................. H04M 1/00
(52) U.S. Cl. ............................... 455/569.2; 455/575.9; 455/345
(58) Field of Search ............................. 455/569.2, 567, 455/564, 575.9, 556.1, 73, 412.1, 558, 343.1–343.6, 345, 418, 552.1

(56) References Cited

U.S. PATENT DOCUMENTS

| | | | |
|---|---|---|---|
| 4,939,768 A | | 7/1990 | Inaba et al. .................... 379/58 |
| 5,404,578 A | * | 4/1995 | Kuge et al. .................... 455/73 |
| 5,559,860 A | * | 9/1996 | Mizikovsky ................ 455/413 |
| 5,659,887 A | * | 8/1997 | Ooe .......................... 455/575.9 |
| 5,797,098 A | | 8/1998 | Schroeder et al. ........... 455/464 |
| 5,943,611 A | | 8/1999 | Mölne .......................... 455/89 |
| 6,014,569 A | * | 1/2000 | Bottum ....................... 455/466 |
| 6,035,191 A | * | 3/2000 | Moore ........................ 455/418 |
| 6,122,682 A | | 9/2000 | Andrews ...................... 710/65 |
| 6,453,180 B1 | * | 9/2002 | Endoh et al. ................ 455/567 |

FOREIGN PATENT DOCUMENTS

EP   0 590 494   4/1994

* cited by examiner

*Primary Examiner*—Sonny Trinh
(74) *Attorney, Agent, or Firm*—O'Shea, Getz & Kosakowski, P.C.

(57) ABSTRACT

A telephone system for a motor vehicle includes a transmit/receive unit that transmits data over a wireless communication channel, and receives data over the wireless communication channel and provides a received signal. The system also includes a control unit that communicates with the transmit/receive unit; a first memory device; and a computing device. The computing device receives the received signal and automatically stores the received signal data in the first memory device when the telephone system is configured in a stand-by mode, which allows incoming data to be stored in the memory device while selectively preventing the transmission of outgoing calls originated by the control unit to the transmit/receive unit. Data can be sent to the motor vehicle telephone system and can be stored there for retrieval by the operator when he returns to the vehicle. The data may include audio and/or video data.

13 Claims, 1 Drawing Sheet

MOTOR VEHICLE TELEPHONE SYSTEM

BACKGROUND OF THE INVENTION

The present invention relates to the field of wireless telephone systems, and in particular to a motor vehicle telephone system.

With the ubiquitous availability of various wireless communications services, motor vehicle telephone users have a large number of communication services and telephone systems to choose from. Examples include GSM, short message services (SMS), general packetized radio services (GPRS), circuit switched data (CSD), universal mobile telecommunications systems (UMTS), and digital European cordless telecommunication (DECT). These communication services enable not only conventional telephone calls to another subscriber, but also the transmission of data such as for example audio and/or video data.

A problem with conventional motor vehicle telephone systems is that they do not operate when the motor vehicle is turned off. Notably, the motor vehicle telephone system can not selectively receive telephone calls when the motor vehicle is turned-off.

Therefore, there is a need for a motor vehicle telephone system that selectively receives telephone calls when the motor vehicle is turned-off.

SUMMARY OF THE INVENTION

A telephone system for a motor vehicle includes a transmit/receive unit that transmits data over a wireless communication channel, and receives data over the wireless communication channel and provides a received signal indicative thereof. The system also includes a control unit that communicates with the transmit/receive unit; a first memory device; and a computing device. The computing device receives the received signal and automatically stores the received signal data in the first memory device when the telephone system is configured in a stand-by mode, which allows incoming data to be stored in the memory device while selectively preventing the transmission of outgoing calls originated by the control unit to the transmit/receive unit.

In the stand-by mode the system may automatically make calls at prescribed times to query a communication service. Any data received from the communication service in response to the query is stored in the first memory.

An operating unit of the telephone system may be turned-off or inactivated (i.e., placed into stand-by mode) so calls (i.e., calls other than the automatic calls to the communication service) can not be made from the telephone system. However, while the telephone system is blocked for outgoing calls, it is kept in stand-by mode for incoming calls to receive incoming calls and store the arriving data in the first memory device.

These inventive measures have the advantage that, even in the absence of the operator, data can be sent to the motor vehicle telephone system and can be stored there for retrieval by the operator when he returns to the vehicle. The data may include audio and/or video data.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
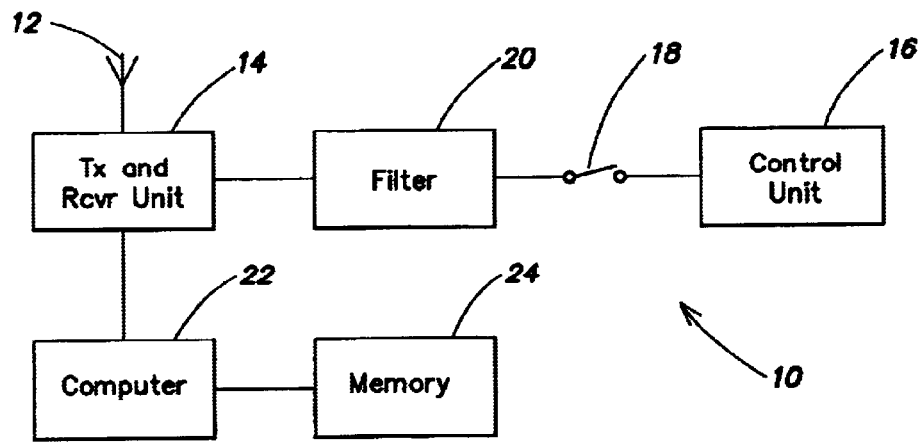
FIG. 1 is a block diagram illustration of a motor vehicle telephone system.

FIG. 1 is a block diagram illustration of a motor vehicle telephone system 10. The system 10 includes an antenna 12 that is connected to a transmission and reception unit 14. A control unit 16 is connected via a switch 18 and a filter 20 to the transmission and reception unit 14. The transmission and reception unit 14 is also connected to the input of a computer 22. The system also includes a memory 24 that receives data from and provides data to the computer 22.

If the switch 18 is closed, the motor vehicle telephone system 10 is configured to make calls and receive calls. However, if the operator turns-off the control unit 16 by opening the switch 18, the telephone system is configured to only receive calls and store the received data. The data received during a call are tested and processed by the computer 22, and stored in the memory 24. By adjusting the filter 20, the operator can block undesired callers. When he returns to his vehicle, the operator can query the memory and hear and/or view the received data (e.g., audio or video).

Figure 2:
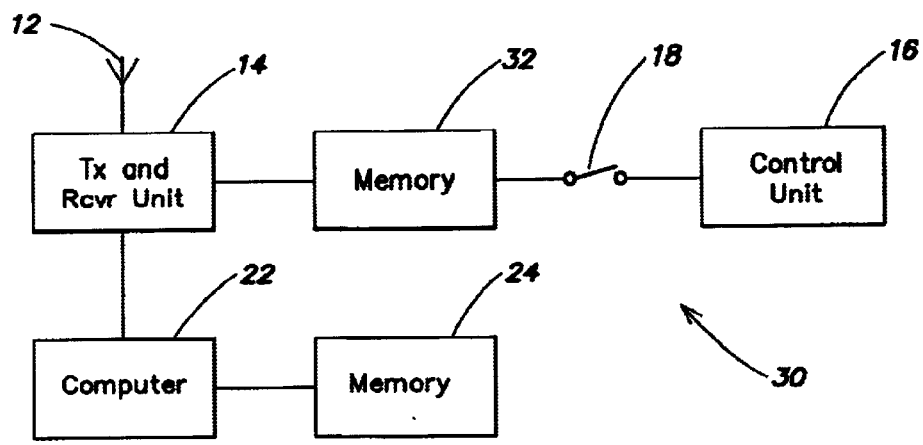
FIG. 2 is a block diagram illustration of an alternative embodiment motor vehicle telephone system.

FIG. 2 is a block diagram illustration of an alternative embodiment motor vehicle telephone system 30. The embodiment illustrated in FIG. 2 is substantially the same as the embodiment illustrated in FIG. 1, with a principal difference that the filter 20 (FIG. 1) has been replaced by a memory 32 in which the operator can enter information representative of undesired callers. The motor vehicle telephone system 30 is then blocked for these undesired callers. Consequently, the telephone system 30 does not accept calls from blocked callers that are stored in the memory 32.

Referring to FIGS. 1 and 2, the motor vehicle telephone system may be configured and arranged to automatically call a communication service at prescribed times in order to query data from the communication service, and store received data responsive to the query in a memory of the telephone system. Advantageously, the motor vehicle telephone system automatically queries and stores data from the communication service, regardless of where the motor vehicle operator is staying. The motor vehicle operator does not have to be present in the vehicle for the system to automatically call the communication service. For example, the telephone system may be configured to automatically call the communication service at non-peak time(s) to retrieve data (if any) when the charges are low.

The telephone system may also test and process the data received in response to a query to the communication service, prior to storing the received data in memory for subsequent retrieval.

The telephone system may also include a subscriber identification module (SIM) card reader that receives a SIM card from the motor vehicle operator, and automatically configures the telephone system for the operator. Obviously, this is desirable when there are multiple vehicle operators.

One of ordinary skill will recognize that the motor vehicle telephone system of the present invention is not limited to a particular communication service. For example, it is contemplated that the telephone system may interface with for example GSM, SMS, GPRS, CSD, UMTS, and/or DECT.

Although the present invention has been shown and described with respect to several preferred embodiments thereof, various changes, omissions and additions to the form and detail thereof, may be made therein, without departing from the spirit and scope of the invention.

What is claimed is:

1. A motor vehicle telephone system, comprising:

a transmit/receive unit that transmits data over a wireless communication channel, and receives data over the wireless communication channel and provides a received signal;

a control unit that communicates with said transmit/receive unit;

a first memory device; and a computing device that receives the received signal and automatically stores the received signal data in the first memory device when the telephone system is configured in a stand-by mode, which allows incoming data to be stored in the first memory device while preventing the transmission of outgoing calls originated by the control unit to the transmit/receive unit, where the transmit/receive unit automatically calls a communication service at prescribed times when the telephone system is configured in the stand-by mode to query data from the communication service, and store received data responsive to the query.

2. The motor vehicle telephone system of claim 1, wherein the data comprises audio data and video data.

3. The motor vehicle telephone system of claim 2, further comprising a second memory device that provides undesirable caller data to the transmit/receive unit, which discards call data from undesirable callers.

4. The motor vehicle telephone system of claim 2, wherein the transmit/receive unit comprises means for discarding data received from the undesirable callers.

5. The motor vehicle telephone system of claim 4, wherein the means for discarding comprises a second memory device that provides undesirable caller data to the transmit/receive unit which discards call data from the undesirable callers.

6. The motor vehicle telephone system of claim 4, further comprising a switching device which in a first position disengages the control unit from the transmit/receive unit, and in a second position engages the control unit and the transmit/receive unit.

7. The motor vehicle telephone system of claim 4, wherein the computing device also tests the received signal and only stores the received data in the first memory device if the data is determined to be valid.

8. The motor vehicle telephone system of claim 7, further comprising a SIM card reader that receives and reads a SIM card to receive user profile data from the SIM card to automatically configure the telephone system operation based upon the user profile data.

9. The motor vehicle telephone system of claim 7, wherein the transmit/receive unit may be configured and arranged to support a plurality of communication services selected from the group including CSD, GSM, GPRS, DECT and SMS.

10. A telephone system for a motor vehicle, comprising:

means for transmitting data over a wireless communication channel, and for receiving data over the wireless communication channel and providing a received signal;

a control unit that communicates with the means for transmitting;

a first memory device; and a computing device that receives the received signal and automatically stores the received signal data in the first memory device when the telephone system is configured in a stand-by mode, which allows incoming data to be stored in the first memory device while preventing the transmission of outgoing calls originated by the control unit to the means for transmitting, the telephone system calls a communication service at prescribed times when the telephone system is configured in the stand-by mode in order to query data from the communication service, and store received data responsive to the query.

11. The telephone system of claim 10, wherein the computing device decompresses the stored received data in response to a playback instruction received by the control unit.

12. The telephone system of claim 10, further comprising a decoder that receives and decompresses the stored received data and provides decompressed data to the control unit in response to a playback instruction received by the control unit.

13. A motor vehicle telephone system, comprising:

a transceiver that transmits data over a wireless communication channel, and receives data over the wireless communication channel and provides a received signal;

a memory device; and a computing device that receives the received signal and automatically stores the received signal data in the memory device when the telephone system is configured in a stand-by mode, which allows incoming data to be stored in the memory device while preventing the transmission of outgoing calls originated by the control unit to the transceiver unit, the transceiver is configured and arranged to call a communication service at prescribed times when the telephone system is configured in the stand-by mode in order to query data from the communication service.

* * * * *

UNITED STATES PATENT AND TRADEMARK OFFICE
CERTIFICATE OF CORRECTION

PATENT NO. : 6,968,217 B2
DATED : November 22, 2005
INVENTOR(S) : Wietzke et al.

It is certified that error appears in the above-identified patent and that said Letters Patent is hereby corrected as shown below:

Column 3,
Line 7, delete "said" and insert -- the --.
Lines 24, 30, 33, 43 and 52, delete "wherein" and insert -- where --.

Column 4,
Line 25, delete "wherein" and insert -- where --.

Signed and Sealed this

Twenty-first Day of February, 2006

JON W. DUDAS
*Director of the United States Patent and Trademark Office*